United States Patent
Rider et al.

(10) Patent No.: US 11,373,415 B2
(45) Date of Patent: Jun. 28, 2022

(54) VEHICLE AND METHOD FOR AVOIDING A COLLISION OF A VEHICLE WITH ONE OR MORE OBSTACLES

(71) Applicant: Intel Corporation, Santa Clara, CA (US)

(72) Inventors: Tomer Rider, Nahariya (IL); Ayoob Nabwani, Haifa (IL); Wenlong Yang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/955,077

(22) PCT Filed: Mar. 31, 2018

(86) PCT No.: PCT/CN2018/081486
§ 371 (c)(1),
(2) Date: Jun. 18, 2020

(87) PCT Pub. No.: WO2019/183981
PCT Pub. Date: Oct. 3, 2019

(65) Prior Publication Data
US 2021/0224559 A1    Jul. 22, 2021

(51) Int. Cl.
*G06V 20/58* (2022.01)
*G06T 7/70* (2017.01)
(Continued)

(52) U.S. Cl.
CPC ............. *G06V 20/58* (2022.01); *B60W 30/09* (2013.01); *B60W 50/16* (2013.01);
(Continued)

(58) Field of Classification Search
None
See application file for complete search history.

(56) References Cited

U.S. PATENT DOCUMENTS 10,229,596 B1 *   3/2019   Weinberg ............... G08G 1/165
10,675,928 B2 *   6/2020   Barnichon ............ B60C 25/002
(Continued)

FOREIGN PATENT DOCUMENTS

| CN | 101380927 A | 3/2009 |
| CN | 102490673 A | 6/2012 |

(Continued)

OTHER PUBLICATIONS

Supplementary European Search Report issued for the corresponding Application No. EP 18 91 1949, dated Sep. 17, 2021, 1 page (for informational purposes only).
(Continued)

*Primary Examiner* — Delomia L Gilliard
(74) *Attorney, Agent, or Firm* — Viering, Jentschura & Partner mbB

(57) ABSTRACT

A vehicle (100) may include one or more image sensors (110) configured to provide sensor image data (112*d*) representing a sensor image of a vicinity of the vehicle (100), and one or more processors (120) configured to determine one or more obstacles (132) from the sensor image data (112*d*), to determine a distance from ground for each of the one or more obstacles (132) based its corresponding image object (114), and to trigger a safety operation when the distance from ground is equal to or less than a safety height associated with the vehicle (100). A method for avoiding a collision of a vehicle with one or more obstacles.

18 Claims, 8 Drawing Sheets

(51) Int. Cl.
*B60W 30/09* (2012.01)
*B60W 50/16* (2020.01)
*G06K 9/62* (2022.01)
*G06T 7/60* (2017.01)
*B60W 50/14* (2020.01)

(52) U.S. Cl.
CPC .............. *G06K 9/6215* (2013.01); *G06T 7/60* (2013.01); *G06T 7/70* (2017.01); *B60W 2050/143* (2013.01); *B60W 2050/146* (2013.01); *B60W 2420/42* (2013.01); *B60W 2554/802* (2020.02); *G06T 2207/10048* (2013.01); *G06T 2207/30261* (2013.01)

(56) References Cited

U.S. PATENT DOCUMENTS

| | | | | |
|---|---|---|---|---|
| 2005/0080530 | A1* | 4/2005 | Arduc | B60G 15/063 |
| | | | | 701/37 |
| 2006/0129292 | A1* | 6/2006 | Ohkubo | B60W 50/14 |
| | | | | 701/38 |
| 2008/0036576 | A1* | 2/2008 | Stein | G08G 1/167 |
| | | | | 340/425.5 |
| 2012/0081218 | A1* | 4/2012 | Nugent | G08G 1/165 |
| | | | | 340/431 |
| 2013/0222592 | A1* | 8/2013 | Gieseke | G08G 1/096708 |
| | | | | 348/148 |
| 2016/0104379 | A1* | 4/2016 | Reinards | A01D 75/185 |
| | | | | 340/435 |
| 2017/0039850 | A1* | 2/2017 | Vanden Berg | G08G 1/096725 |
| 2018/0162400 | A1* | 6/2018 | Abdar | G08G 1/096741 |

FOREIGN PATENT DOCUMENTS

| | | |
|---|---|---|
| CN | 103253265 A | 8/2013 |
| DE | 202013103033 U1 | 7/2013 |
| DE | 102013209873 | * 12/2014 |
| DE | 102015100719 A1 | 7/2016 |
| EP | 3138707 A1 | 3/2017 |
| EP | 3247606 A1 | 11/2017 |
| JP | 2006050451 A | * 2/2006 |

OTHER PUBLICATIONS

International search report issued for the corresponding PCT application No. PCT/CN2018/081486, dated Jan. 14, 2019, 5 pages (for informational purposes only).

* cited by examiner

VEHICLE AND METHOD FOR AVOIDING A COLLISION OF A VEHICLE WITH ONE OR MORE OBSTACLES

CROSS-REFERENCE TO RELATED APPLICATIONS

This application is a national stage entry, according to 35 U.S.C. § 371, of PCT Application No. PCT/CN2018/081486 filed on Mar. 31, 2018, which is herein incorporated by reference in its entirety.

TECHNICAL FIELD

Various aspects relate generally to a vehicle and a method for avoiding a collision of a vehicle with one or more obstacles.

BACKGROUND

In general, modern vehicles may include various active and passive assistance systems to assist during driving the vehicle. As an example, an emergency brake assist (EBA), also referred to as brake assist (BA or BAS) may be implemented in the vehicle. The emergency brake assist may include a braking system that increases braking pressure in an emergency. The emergency may be a predicted collision of the vehicle with another vehicle or with a fixed object, as for example, a wall, a tree, etc. The vehicle may include one or more sensors and one or more processors that are configured to predict a frontal collision of the vehicle with an obstacle. Further, a vehicle may include a parking assistance system, wherein parking sensors (e.g., proximity sensors) are used to sense obstacles in the vicinity of the vehicle while parking. Further, one or more autonomous vehicle maneuvering systems may be implemented in a vehicle, e.g., to move the vehicle into a parking position, to more or less autonomously drive the vehicle, etc.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
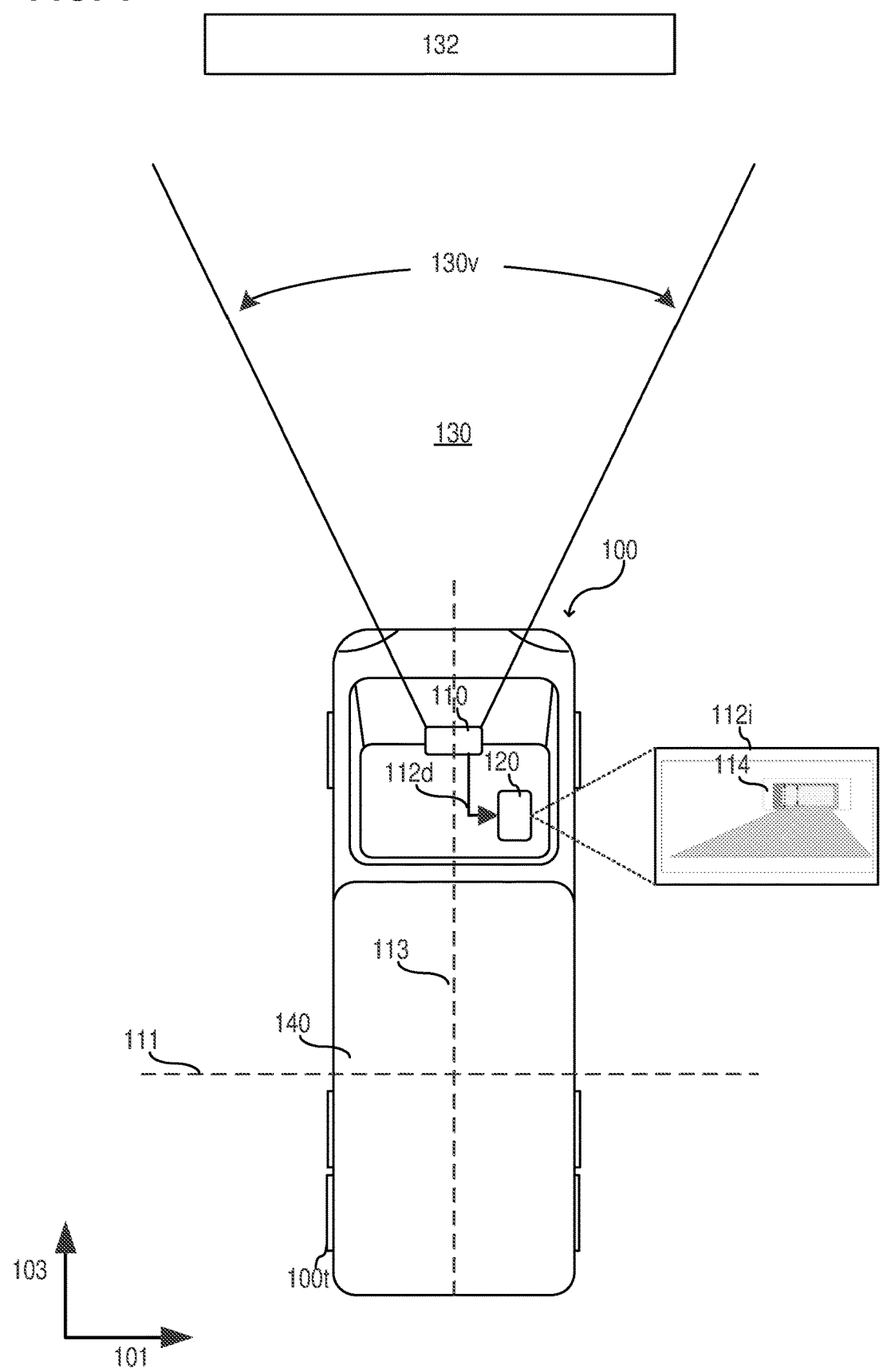
FIG. 1 shows an exemplary vehicle including a collision avoidance system, according to some aspects.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration". Any aspect or design described herein as "exemplary" is not necessarily to be construed as preferred or advantageous over other aspects or designs.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g., "a plurality of [objects]," "multiple [objects]") referring to a quantity of objects expressly refers more than one of the said objects. The terms "group (of)," "set [of]," "collection (of)," "series (of)," "sequence (of)," "grouping (of)," etc., and the like in the description and in the claims, if any, refer to a quantity equal to or greater than one, i.e. one or more.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The terms "processor" as, for example, used herein may be understood as any kind of entity that allows handling data. The data may be handled according to one or more specific functions executed by the processor. Further, a processor as used herein may be understood as any kind of circuit, e.g., any kind of analog or digital circuit. The term "handle" or "handling" as for example used herein referring to data handling, file handling or request handling may be understood as any kind of operation, e.g., an I/O operation, and/or any kind of logic operation. An I/O operation may include, for example, storing (also referred to as writing) and reading.

A processor may thus be or include an analog circuit, digital circuit, mixed-signal circuit, logic circuit, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

Differences between software and hardware implemented data handling may blur. A processor, controller, and/or circuit detailed herein may be implemented in software, hardware and/or as hybrid implementation including software and hardware.

The term "system" (e.g., a computing system, a memory system, a storage system, etc.) detailed herein may be understood as a set of interacting elements, wherein the elements can be, by way of example and not of limitation, one or more mechanical components, one or more electrical components, one or more instructions (e.g., encoded in storage media), and/or one or more processors, and the like.

The term "mechanism" (e.g., a spring mechanism, etc.) detailed herein may be understood as a set of interacting elements, wherein the elements can be, by way of example and not of limitation, one or more mechanical components, one or more electrical components, one or more instructions, etc.

As used herein, the term "memory", "memory device", and the like may be understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa.

The term "vehicle" as used herein may be understood as any suitable type of vehicle, e.g., a motor vehicle also referred to as automotive vehicle. As an example, a vehicle may be a car also referred to as a motor car, a passenger car, etc. As another example, a vehicle may be a truck (also referred to as motor truck), a van, etc. The term "distance from ground" as used herein may be also referred to as height above ground, above ground level, etc. In some aspects, the "ground" as used herein may be understood as any type of solid infrastructure, e.g. a street, etc., below the respective obstacle. The term "lane" or "driving lane" as used herein may be understood as any type of solid infrastructure (or section thereof) on which a vehicle may drive.

According to various aspects, information (e.g., obstacle information) may be handled (e.g., processed, analyzed, stored, etc.) in any suitable form, e.g., data may represent the information and may be handled via a computing system.

In some aspects, one or more range imaging sensors may be used for sensing objects in the vicinity of a vehicle. A range imaging sensor may allow associating range information (or in other words distance information or depth information) with an image, e.g., to provide a range image having range data associated with pixel data of the image. This allows, for example, providing a range image of the vicinity of the vehicle including range information about one or more objects depicted in the image. The range information may include, for example, one or more colors, one or more shadings associated with a relative distance from the range image sensor, etc. According to various aspects, position data associated with positions of objects relative to the vehicle and/or relative to an assembly of the vehicle may be determined from the range information. According to various aspects, a range image may be obtained, for example, by a stereo camera, e.g., calculated from two or more images having a different perspective. Three-dimensional coordinates of points on an object may be obtained, for example, by stereophotogrammetry, based on two or more photographic images taken from different positions. However, a range image may be generated based on images obtained via other types of cameras, e.g., based on time-of-flight (ToF) measurements, etc. Further, in some aspects, a range image may be merged with additional sensor data, e.g., with sensor data of one or more radar sensors, etc.

One or more aspects are related to a comparatively high vehicle, as for example, a truck, a lorry, a bus, a van, a special-purpose vehicle, etc., having for example a height of more than about 2 m. In some aspects, a vehicle itself may have a height of less than about 2 m but may include one or more attachment parts and/or may carry a cargo, etc. such that the effective height of the vehicle considering the one or more attachment parts and/or the cargo, etc., may be greater than 2 m.

In general, such comparatively high vehicles may be prone to damages caused by a collision of the vehicle with a structure having a clearance height less than the height of the vehicle. As an example, bridge related accidents may be very common, mostly as a result of drivers that do not pay attention to signs, low bridges, tunnels, electricity wires of a tram or of a power grid, etc. Those accidents may occur mostly with trucks. However, accidents may occur as well with cars having a load on top of their roofs, etc. Those accidents may occur due to wrong and/or new markings due to paving or other re-construction reasons, or simply due to not paying attention.

Commonly used solutions may include a traffic sign detection system that may detect the height of a bridge. However, this may be not enough protection since not all traffic signs may be captured correctly. Further, there may many situations where no traffic sign is placed before a bridge as well, so that no detection of the height of the bridge is possible with traffic sign detection.

There are many causes for vehicle over-height accidents, as for example: driver fatigue, substance abuse, speeding, failure to adhere to the rules of the road, failure to properly maintain trucks, improperly loaded trucks or cargo shifting as well as illegal over-sized loads, over-inflated tires, over-height trucks attempting to pass under low overpasses or bridges, pilot/escort vehicle operator (P/EVO) error, trucks following other traffic too closely, etc.

In general, an over-height vehicle detection system (OVDS) may include several stationery systems that may provide detection and alert the drivers. These systems are stationery, very costly, and therefore may be placed only in strategic places, rather than everywhere. In addition, those stationary systems may provide only a visual feedback and/or a sound feedback to the driver, which may not ensure that the driver will receive the feedback, since it is performed usually outside of the vehicle, wherein inside of the vehicle it may be a noisy and/or unfocused environment.

Various aspects are related to efficiently prevent over-height accidents, i.e., a collision of a vehicle with an obstacle that has a lower clearance height than the actual maximum height of the vehicle. In one or more aspects, a non-stationary system is provided that may be implemented into an on-board system of the vehicle. According to some aspects, the collision avoidance system described herein may be connected with other safety systems within the vehicle, e.g., the vehicle may be stopped automatically in a safe manner to avoid the collision (e.g. as part of an autonomous vehicle control).

According to various aspects, a system is provided that may prevent damage during driving, e.g., to prevent a collision of an obstacle (e.g., of an overpass, a tunnel, a wire, a traffic light, a traffic sign, etc.) with the vehicle, with an attachment part of the vehicle (e.g., a bicycle carrier on the roof of the vehicle, a roof box, etc.), and/or with a cargo of the vehicle.

In one or more aspects, a collision avoidance function may be implemented via one or more on-board components of the vehicle, such as a front camera, a processing unit, etc., in order to detect obstacles that may be higher than the defined height of the vehicle.

In various aspects, a depth camera (or any other range image device) may be used, for example, aligned in forward driving direction to detect during driving when an obstacle may come too close and would cause a collision with the vehicle due to the height of the vehicle. In a similar way, at least one depth camera (or any other range image device) may be used, for example, that is aligned in rear driving direction to avoid a collision in the case that an obstacle approaches from this direction.

According to various aspects, one or more sensors and a computing system may be used to implement the collision avoidance functions described herein. The computing system may include, for example, one or more processors, one or more memories, etc. The computing system may be communicatively coupled to the one or more sensors of the vehicle to obtain and analyze sensor data generated by the one or more sensors. According to some aspects, the one or more processors may be configured to generate depth images in real-time from the data received from one or more range imaging sensors.

According to various aspects, a vehicle may include an external structure and one or more assemblies attached to the external structure that may defined a maximum height of the vehicle.

In the following, a motor vehicle is illustrated and described exemplarily as the vehicle, wherein two side mirror assemblies of the motor vehicle may be illustrated and described exemplarily as the at least one assembly of the vehicle. However, other types of vehicles may be provided including the same or similar structures and functions as described exemplarily for the motor vehicle. Further, the vehicle may include any other type of assembly that is configured in the same or similar way as described exemplarily for the respective side mirror assembly.

FIG. 1 illustrates a vehicle 100, e.g., a motor vehicle, in a schematic view, according to various aspects. The vehicle 100 may be a truck, a lorry, a van, a bus, a car, or any other vehicle driving on the ground.

In some aspects, the vehicle 100 may define a longitudinal axis 113. The longitudinal axis 113 may be associated with a forward driving direction (e.g., illustratively in direction 103 as illustrated in FIG. 1) and/or a rear driving direction (e.g., illustratively opposite to the direction 103). Further, the vehicle 100 may define a lateral axis 111 perpendicular to the longitudinal axis 113. A height of the vehicle 100 (e.g., a maximum height) of the vehicle 100 may be determined perpendicular to both the lateral axis 111 and the longitudinal axis 113 (e.g., illustratively perpendicular to the directions 101, 103 illustrated in FIG. 1).

According to various aspects, the vehicle 100 may include one or more sensors 110, in some aspects one or more image sensors (e.g. one or more cameras). Further, the vehicle 100 may include one or more processors 120. The one or more processors 120 may be part of a computing system, e.g. of a head unit or a central computer of the vehicle 100.

The one or more sensors 110 may be configured to provide sensor image data 112d to the one or more processors 120. The sensor image data 112d may represent an image (also referred to as sensor image or camera image) 112i of a vicinity 130 of the vehicle 100. Illustratively, the sensor image 112i may correspond to a field of vision 130v (also referred to as field of view) of the one or more sensors 110. According to various aspects, the one or more sensors 110 may be configured such that the field of vision 130v has a lateral dimension (e.g. in a horizontal plane parallel to the lateral axis 111 and the longitudinal axis 113) and a vertical dimension (e.g. in a vertical plane perpendicular to the lateral axis 111 and parallel to the longitudinal axis 113). Illustratively, based on the vertical dimension of the field of vision 130v (see for example FIG. 2A), the one or more sensors 110 may be able to detect height information of one or more objects in the vicinity 130 of the vehicle 100.

According to various aspects, the one or more sensors 110 may include, for example, one or more cameras (e.g., one or more depth cameras, one or more stereo cameras, etc.), one or more ultrasonic sensors, one or more radar (radio detection and ranging) sensors, one or more lidar (light detection and ranging) sensors, etc. The one or more sensors 110 may include, for example, any other suitable sensor that allows a detection of an object and corresponding height information associated with the object.

According to various aspects, the one or more processors 120 may be configured to determine one or more obstacles 132 from the sensor image data 112d (or in other words from the sensor image 112i). The one or more obstacles 132 (in the real world) may correspond to one or more image objects 114 of the sensor image 112i, see for example FIG. 2A. Illustratively, the obstacle detection may be based on the sensor image data 112d. However, additional data from the one or more sensors 110 may be used to enhance the obstacle detection. As an example, one or more image objects may be correlated with the one or more obstacles 132 using data merging from at least two different types of sensors, e.g. from at least one image sensor and at least one range sensor, etc.

According to various aspects, the one or more processors 120 may be configured to determine a distance from ground for each of the one or more obstacles 132 based its corresponding image object in the sensor image 112i.

Further, the one or more processors 120 may be configured to trigger a safety operation when the distance from ground is equal to or less than a safety height associated with the vehicle.

Figure 2A:
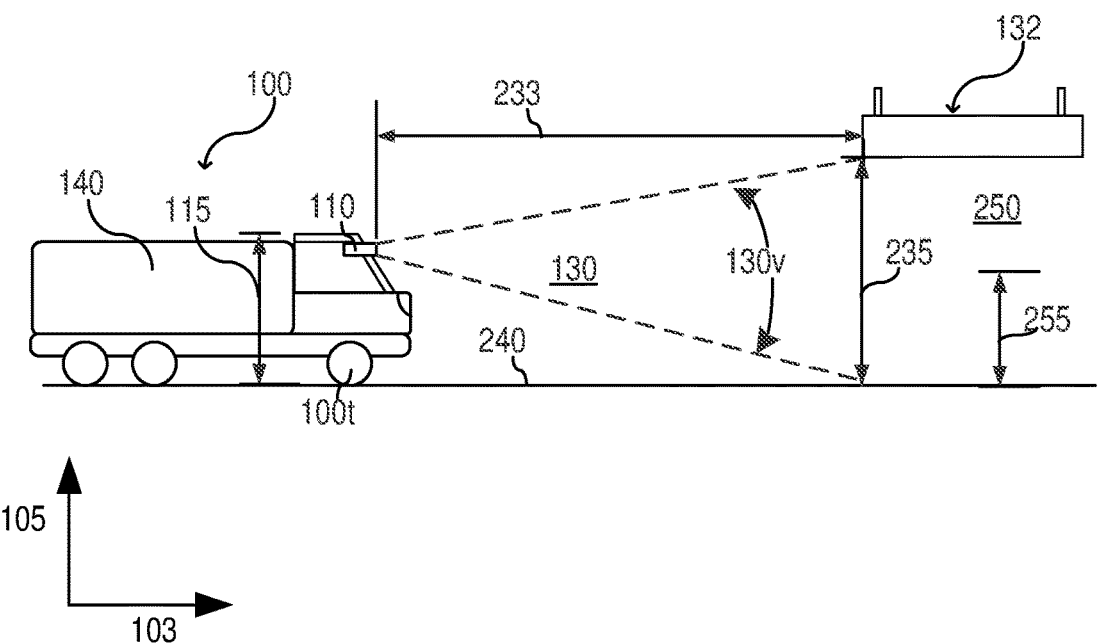
FIG. 2A shows an exemplary vehicle including a collision avoidance system, according to some aspects.

According to some aspects, a monitoring area 250 located ahead of the vehicle 100 may be monitored to detect obstacles that are disposed above a predefined height level 255, e.g. having a distance to ground of more than about two meters but less than five meters that could be a possible threat for collision depending of the maximum height of the vehicle 100 (see FIG. 2A). The safety height may be greater than a maximum height of the vehicle 100 and/or of a cargo 140 of the vehicle 100.

According to various aspects, the one or more sensors 110 and the one or more processors 120 described herein may be a collision avoidance system or may be part of a collision avoidance system.

Figure 2B:
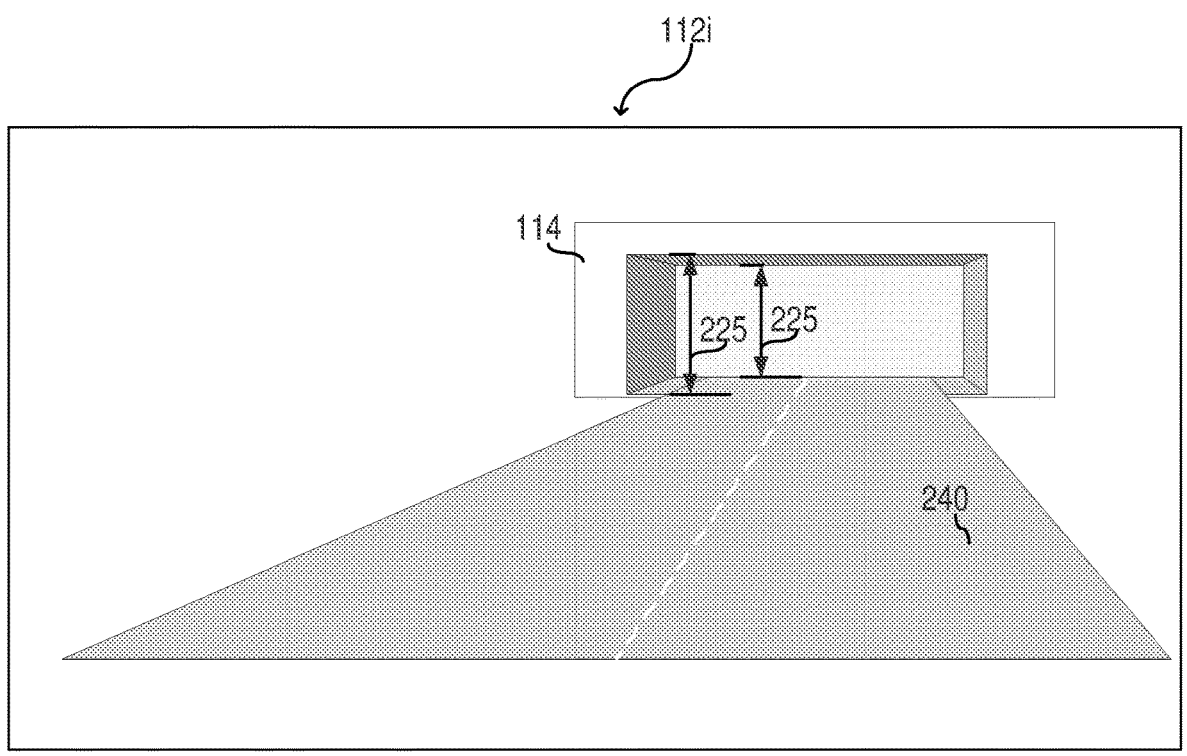
FIG. 2B shows a sensor image associated with the collision avoidance system in a more detailed view, according to some aspects.

FIG. 2A illustrates the vehicle 100 in a schematic side view, according to various aspects. The direction 105 may be aligned perpendicular to the directions 101, 103 illustrated in FIG. 1. FIG. 2B illustrates a more detailed view of the corresponding sensor image 112i. According to various aspects, for an obstacle 132, e.g. for an overpass (as for example a bridge), a traffic light, a traffic sign, a tunnel, a wire, etc., a corresponding distance from ground 235 may be determined. The distance from ground 235 may be determined in vertical direction (e.g. parallel to direction 105 illustrated in FIG. 2A).

Illustratively, the distance from ground 235 may be a correlated with a clearance height associated with the obstacle 132. As an example, a bridge or a tunnel with a clearance height of a value X may allow a vehicle 100 with a maximum height 115 of the value X or less than the value X to drive under the bridge or tunnel without a risk of a collision with the bridge due to the height. The clearance height may consider a minimal height over ground of the obstacle 132 relative to the driving lane 240 running under the obstacle 132.

According to various aspects, the respective distance from ground 235 may be determined based on the sensor image data 112d, or, in other words, based on the sensor image 112i. To identify and analyze an image object 114 that is associated with the obstacles 132 various image processing methods may be used. In addition, auxiliary data from other sensors than the one or more image sensors may be used to correlate the image object 114 in the sensor image 112i with the obstacles 132 in the real world, e.g. located in driving direction of the vehicle 100. Therefore, an obstacle range 233 associated with a range from an obstacle 132 to the one or more sensors 110 may be determined to correlate a size of a corresponding image object or of a corresponding a distance between two image objects (e.g. an image distance from ground 225) with a size of the obstacle 132 in the real world or with a distance (e.g. a distance from ground 235) in the real world. There may be various possibilities to determine the obstacle range 233. As an example, the obstacle range 233 may be determined from the sensor image data 112d or in other words from the sensor image 112i using a calibrated optical imaging system, as illustrated exemplarily in FIG. 4. As another example, the obstacle range 233 may be determined via one or more range sensors, e.g. based on radar, etc. According to some aspects, one or more range imaging sensors (e.g. at least one stereo camera) may be used to generate the sensor image 112i as well as the range information associated with one or more image objects 114 of the sensor image 112i. In this case, the obstacle range 233 may be determined from the range information provided by the one or more range imaging sensors.

Figure 3:
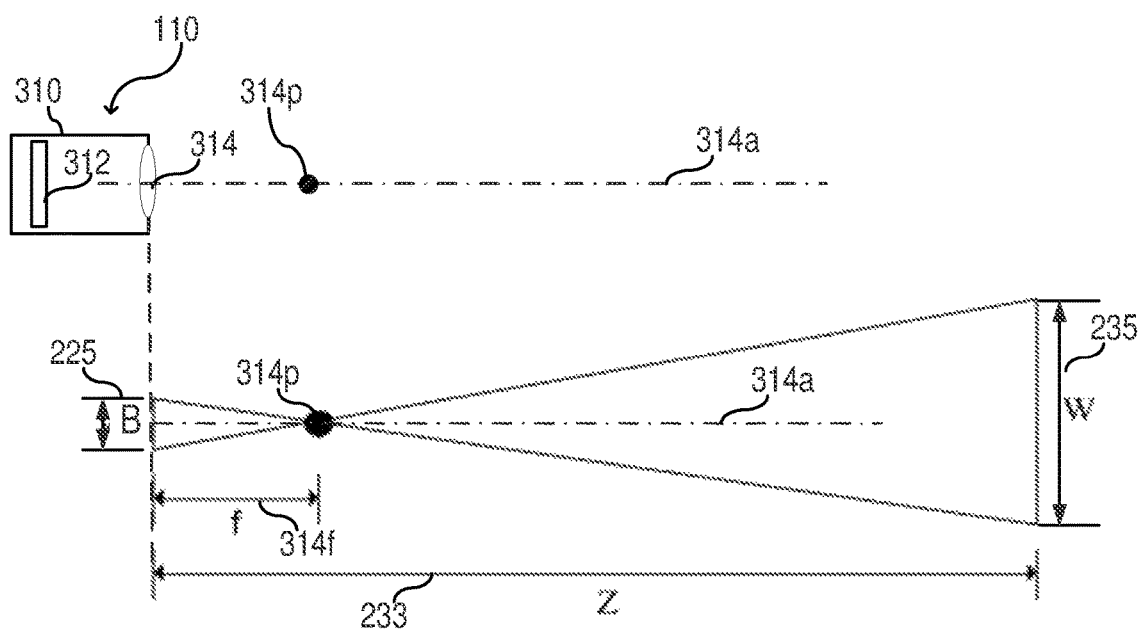
FIG. 3 shows an exemplary optical imaging system of the collision avoidance system, according to some aspects.

According to various aspects, the one or more sensors 110 may include or may be part of an optical imaging system. FIG. 3 illustrates a schematic view of an optical imaging system 310 and exemplary optical properties associated with the optical imaging system 310. The optical imaging system 310 may include an image sensor 312, e.g. a charge-coupled device (CCD) sensor, etc. The optical imaging system 300 may include at least one lens 314 having a focal length 314f associated therewith. In the case that a plurality of lenses is used for imaging, the focal length 314f may be an effective focal length associated with the plurality of lenses. Further, a front focal point 314p may be associated with the optical imaging system. In general, any ray that may pass through the front focal point 314p may emerge from the at least one lens 314 parallel to a corresponding optical axis 314a.

According to various aspects, the determination of the distance from ground 235 of the obstacle 132 (see also FIG. 2A and FIG. 2B) may include determining the obstacle range 233 associated with a range of a respective obstacle 132 from the at least one lens 314 of the optical imaging system 300. Based on the sensor image 112i, an image distance from ground 225 may be determined for the image object 114 that corresponds to the obstacle 132.

Using the optical properties, the distance from ground 235 may be determined (e.g. estimated, calculated, etc.) based on the focal length 314f, the image distance from ground 225, and the obstacle range 233. The optical properties of the at least one lens 314 (in other words of the optical imaging system 310) may be estimated based on calculation, calibration (e.g. using test measurements), etc.

According to some aspects, the optical properties of the at least one lens 314 may be approximated via one or more lens equations and the distance from ground may be calculated using the at least one lens equation. For an optical imaging system, e.g. a front camera of the vehicle 100, a relationship between a focal length f, an object size W, an image size B, and an object distance Z may be as follows:

$$W = (Z - f) \cdot \frac{B}{f}.$$

Therefore, the distance from ground 235 may be determined based on the determined obstacle range 233, the determined image distance from ground 225, and the focal length 314f accordingly.

As an example, an on board camera of the vehicle 100 may be used to capture and detect obstacles in front of the vehicle 100 (or in a similar way in the back of the vehicle 100). In addition, various further inputs may be used (e.g. from maps, from a sign detection system, etc.) to increase confidence with identifying the one or more obstacles.

In various aspects, determining a (e.g. estimated) bridge or tunnel clearance height, the current velocity of the vehicle 100, the time to impact, etc., may enable the system to alert the driver. In the case the vehicle may be operated with a sufficient degree of autonomous functions, one or more other safety operations (also referred to as preventive actions) may be triggered and carried out.

In various aspects, the safety operation that is triggered when a collision threat is predicted may include one or more of the following safety operations: stopping the vehicle, slowing the vehicle down, sending a signal to an external infrastructure, generating an acoustical alarm to the driver of the vehicle, generating an optical alarm to the driver of the vehicle, generating a vibration alarm to the driver of the vehicle, and/or reducing a maximum height of the vehicle. The collision threat may be predicted when the distance from ground 235 is equal to or less than a safety height associated with the vehicle 100, as described exemplarily above. In an example, the collision threat may be predicted when the distance from ground 235 is equal to or less than the maximum height 115 of the vehicle 100, as described exemplarily above. In some aspects, the safety operation may include reducing an inflation pressure of one or more tires 100t of the vehicle 100 (see FIG. 2A) to reduce the maximum height 115 of the vehicle. In this case, the vehicle 100 may include at least an inflation pressure control device configured to determine the inflation pressure of a respective tire of the vehicle 100 and to control (e.g. to open) a valve of the tire to reduce the inflation pressure to a predefined threshold.

Figure 4:
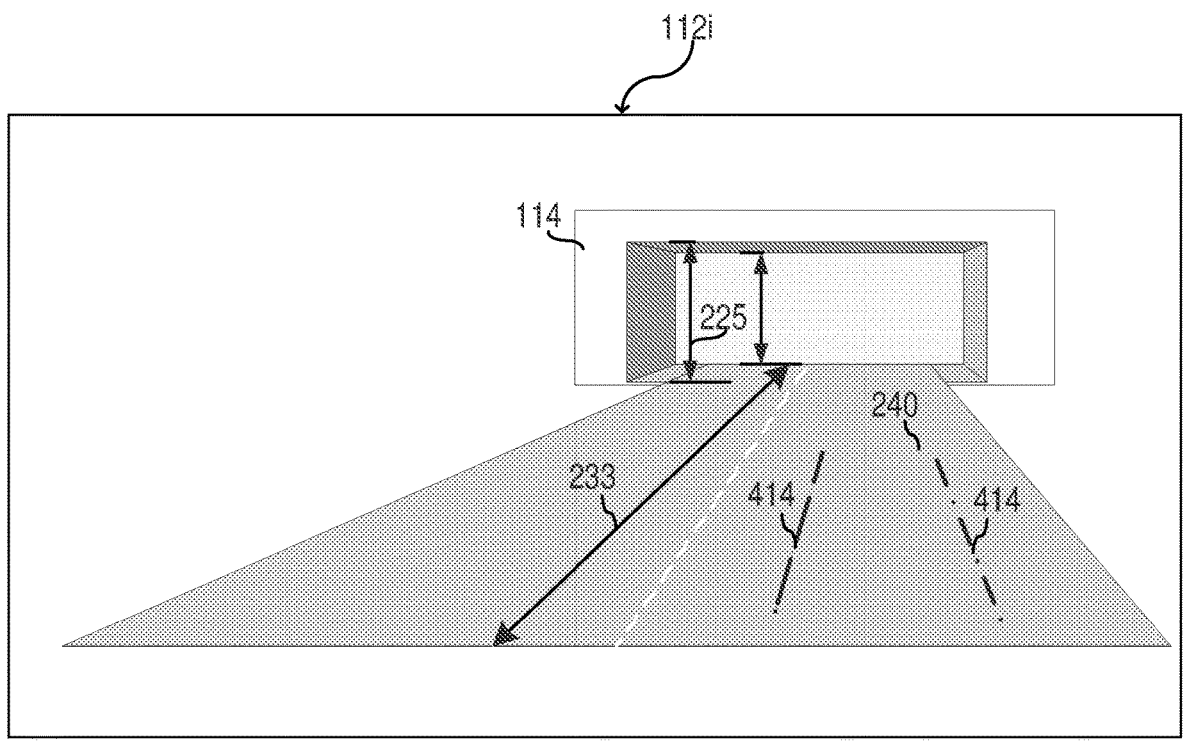
FIG. 4 shows a sensor image with superimposed calibrated camera lines, according to some aspects.

According to various aspects, the one or more processors 120 may be further configured to determine the obstacle range 233 for each of the one or more obstacles 132 based on one or more calibrated camera lines superimposed onto the sensor image 112i (e.g. onto the camera image from the one or more cameras used for obstacle detection). FIG. 4 illustrates a sensor image 112i having two calibrated camera lines 414 superimposed (in other words overlaid) onto the sensor image 112i. This may allow determining the obstacle range 233 from the sensor image 112i itself.

Figure 5:
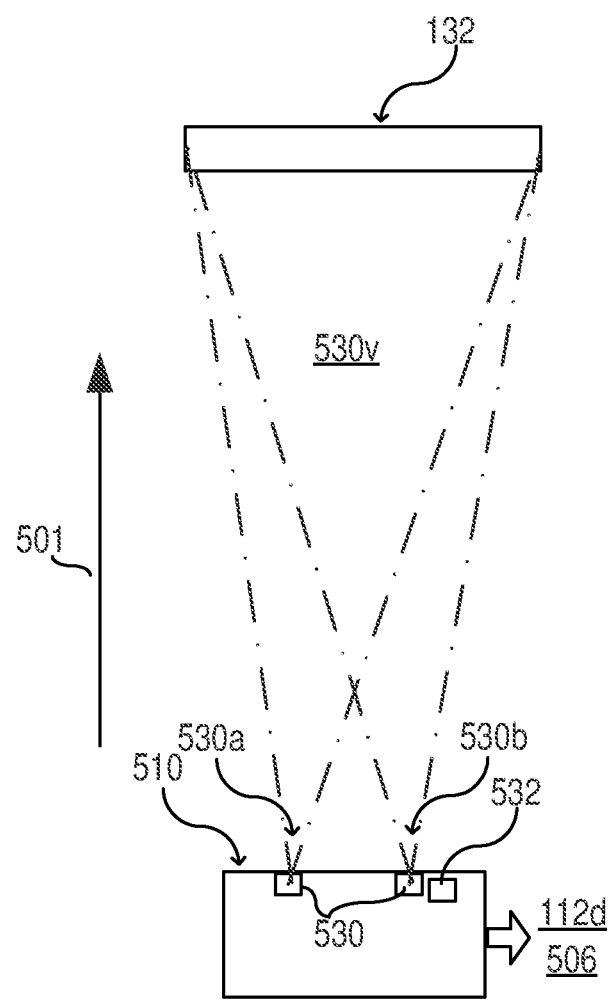
FIG. 5 shows an exemplary a range imaging sensor of the collision avoidance system, according to some aspects.

FIG. 5 shows a range imaging sensor 510 in a schematic view, according to various aspects. The range imaging sensor 510 may be used to provide the sensor image data 112d to the one or more processors 120 of the vehicle 100, as described herein. Further, the range imaging sensor 510 may be configured to provide range information 506 to the one or more processors 120. In other words, the range imaging sensor 510 may be configured to provided range image data to the one or more processors 120, and the one or more processors 120 may be configured to determine the one or more obstacles 132, the image distance from ground 225, and the obstacle range 233 from the range image data.

According to various aspects, the range imaging sensor 510 may include at least two cameras 530 configured to generate at least two photographic images taken from different vantage points 530a, 530b to generate the sensor image 112i having range information 506 associated therewith. The range information 506 may be associated with the one or more image objects 114 of the sensor image 112i and therefore with the one or more obstacles 132.

According to some aspects, an infrared illumination device 532 may be used to at least partially illuminate a field of vision 530v of the range imaging sensor 510. In a similar way, the infrared illumination device 532 may be used to at least partially illuminate the field of vision 130 of the one or more sensors 110 described above, e.g. with reference to FIG. 1.

According to various aspects, a line of vision 501 of the one or more image sensors or the one or more range imaging sensors 510 may be aligned in a forward driving direction and/or in a rear driving direction of the vehicle 100.

According to various aspects, the vehicle 100 may include one or more cameras 110 configured to provide at least a camera image 112i of a vicinity 130 of the vehicle 100 along a driving lane 240, see for example FIG. 2A and FIG. 4. The vehicle 100 may further include one or more processors 120 configured to determine, from the camera image 112i, one or more obstacles 132 disposed over the driving lane 240. The one or more obstacles 132 may not have a direct connection to the driving lane 240 so that the vehicle 100 may drive under the one or more obstacles 132.

The one or more processors 120 may be further configured to determine a clearance height for each of the one or more obstacles 132 based on one or more image objects 114 from the camera image 112i associated with the one or more obstacles 132. The determination of the clearance height may include to determine a minimal distance from ground of the one or more obstacles 132 with respect to the driving lane 240. Illustratively, it may be ensured that all obstacles that are disposed vertically over the driving lane 240 may have a distance from ground 235 (in other words a vertical distance to the driving lane 240) equal to or greater than a (e.g. predefined) safety height. As described herein, the safety height may be associated with the maximum height 115 of the vehicle 100 and may be greater than the maximum height 115. As an example, the safety height may be a sum of the maximum height 115 of the vehicle 100 and a safety tolerance. The safety tolerance may be, for example, in the range from about 1 cm to about 20 cm, as an example. Further, the one or more processors 120 may be configured to trigger any desired safety operation when the clearance height is equal to or less than the safety height.

Figure 6A:
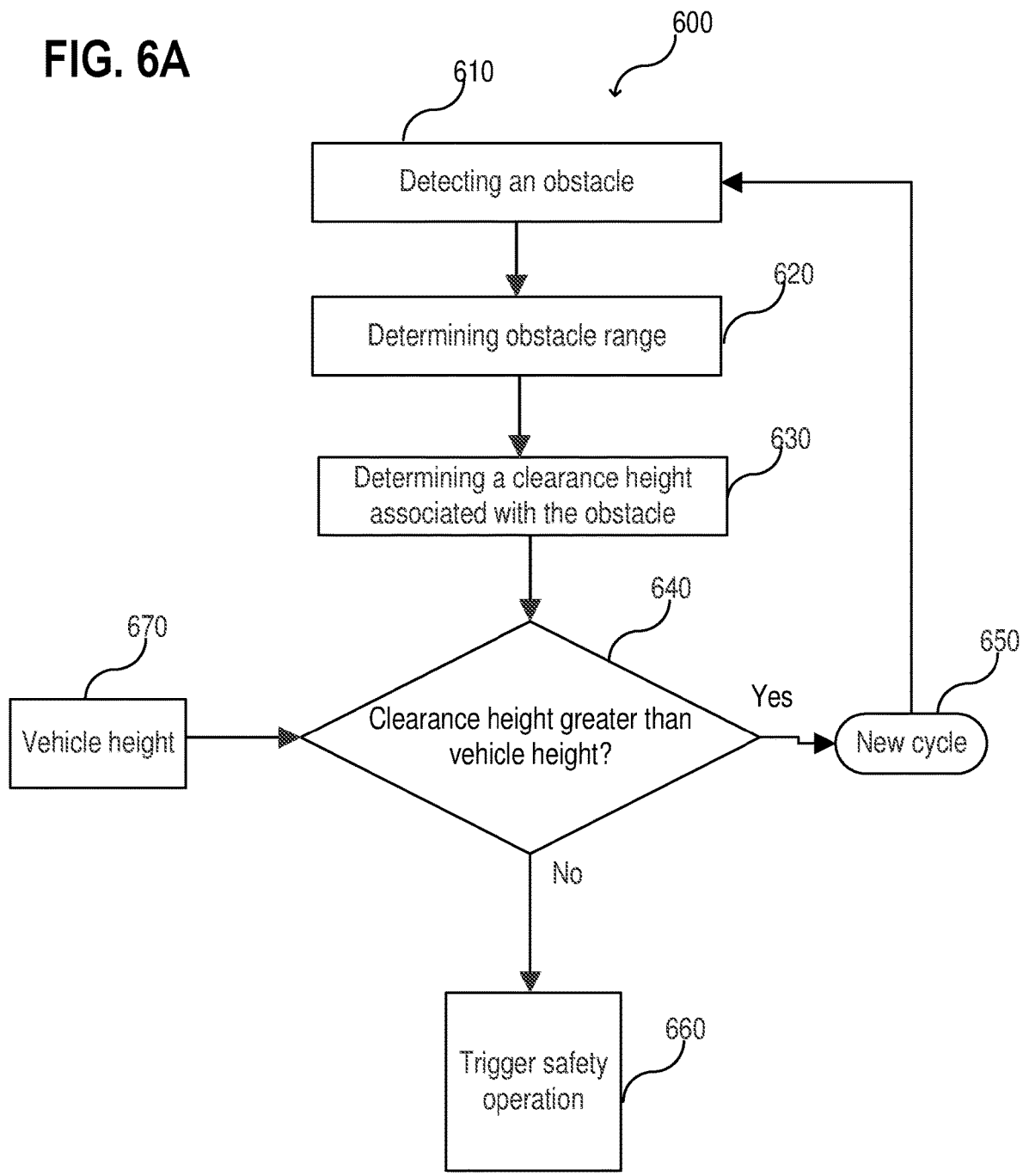
FIG. 6A and FIG. 6B show an exemplary flow diagram of a method for collision avoidance, according to some aspects.
Figure 6B:
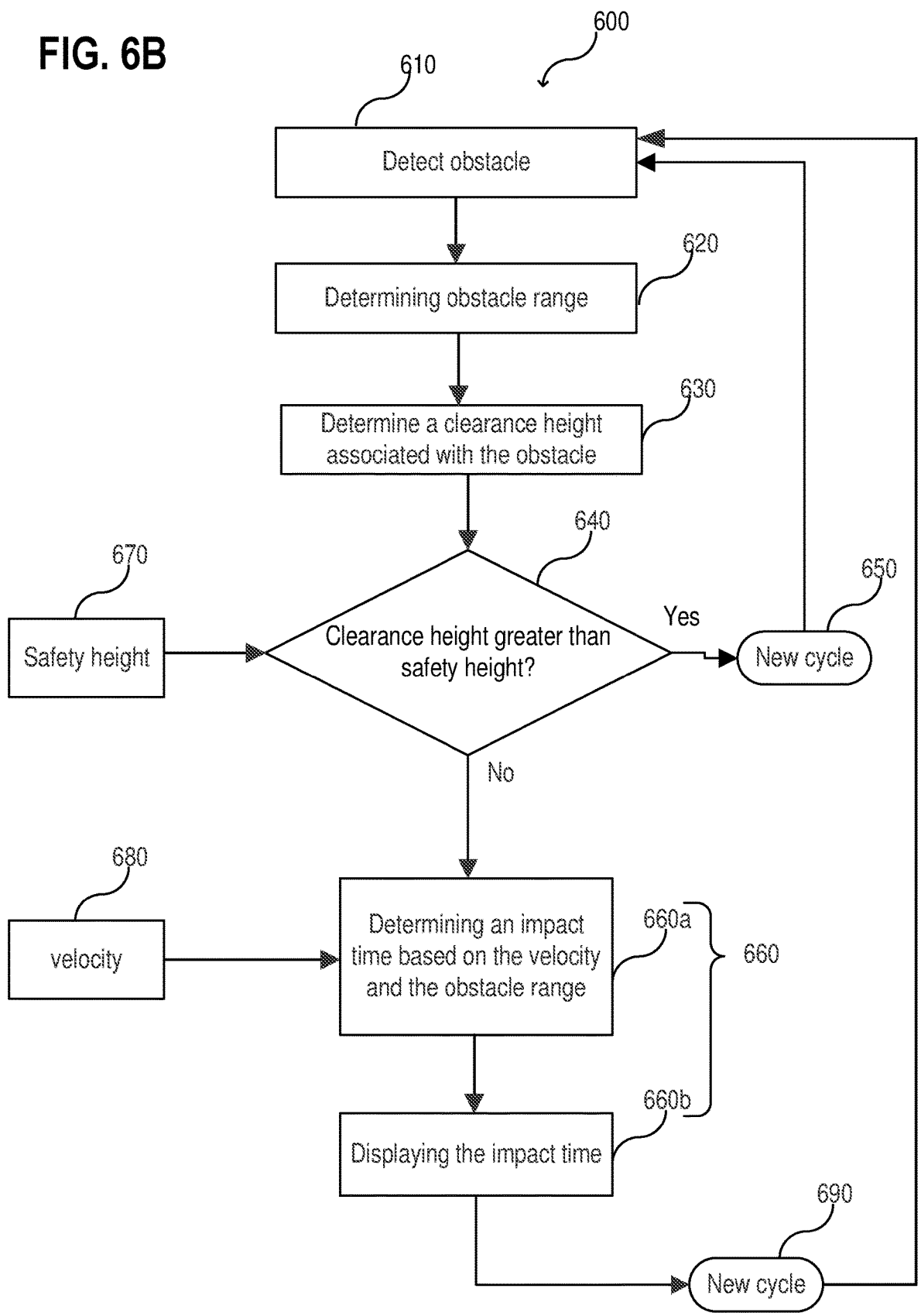

FIG. 6A and FIG. 6B illustrate a schematic flow diagram of a method 600 for collision avoidance, according to various aspects. According to various aspects, a collision avoidance system may be used in a vehicle 100, wherein the collision avoidance system is configured to carry out the method 600.

The method 600 may include, in 610, detecting an obstacle. As an example, detecting a bridge, detecting a tunnel, detecting wires running over a street. The obstacle may be detected via a camera of the vehicle 100. The camera may be a front camera. Alternatively, the camera may be a back camera.

The method 600 may include, in 620, determining (e.g. estimating) the obstacle range, e.g. a substantially horizontal distance of the obstacle from the vehicle 100 (or from the front camera of the vehicle 100). The determination of the obstacle range may be based on one or more calibrated lines of the camera.

The method 600 may include, in 630, determining whether a clearance height associated with the obstacle is at least greater than the maximum height of the vehicle 100. The clearance height may be calculated based on lens equations associated with imaging properties of the camera.

When the clearance height is greater than the maximum height of the vehicle 100, the operation for the respective frame ends and a new frame (or a new cycle) may be started in 650 beginning with operation 610.

The method 600 may include, in 640, to check, whether the clearance height is greater than the safety height. When the clearance height is not greater than the maximum height of the vehicle 100, a safety operation is triggered in 660.

In 670, the (current) maximum height of the vehicle 100 may be provided for the operation 640. Therefore, height data may be obtained from another sensor and/or algorithm. The height data may be, for example, stored in a memory and provided from the memory to the one or more processors 120 to carry out the operation 640.

As illustrated in FIG. 6B, the safety operation 660 that may be triggered may include: in 660a, determining (e.g. calculating) an impact time based on the velocity of the vehicle 100 and the determined obstacle range; and, in 660b, displaying the impact time to a driver of the vehicle 100.

In 680, the (e.g. current) velocity of the vehicle 100 may be provided for the operation 660a. Therefore, velocity data may be obtained from another sensor and/or algorithm.

Optionally, after displaying the impact time, the operation for the respective frame may end and a new frame (or a new cycle) may be started in 690 beginning with operation 610.

Figure 7:
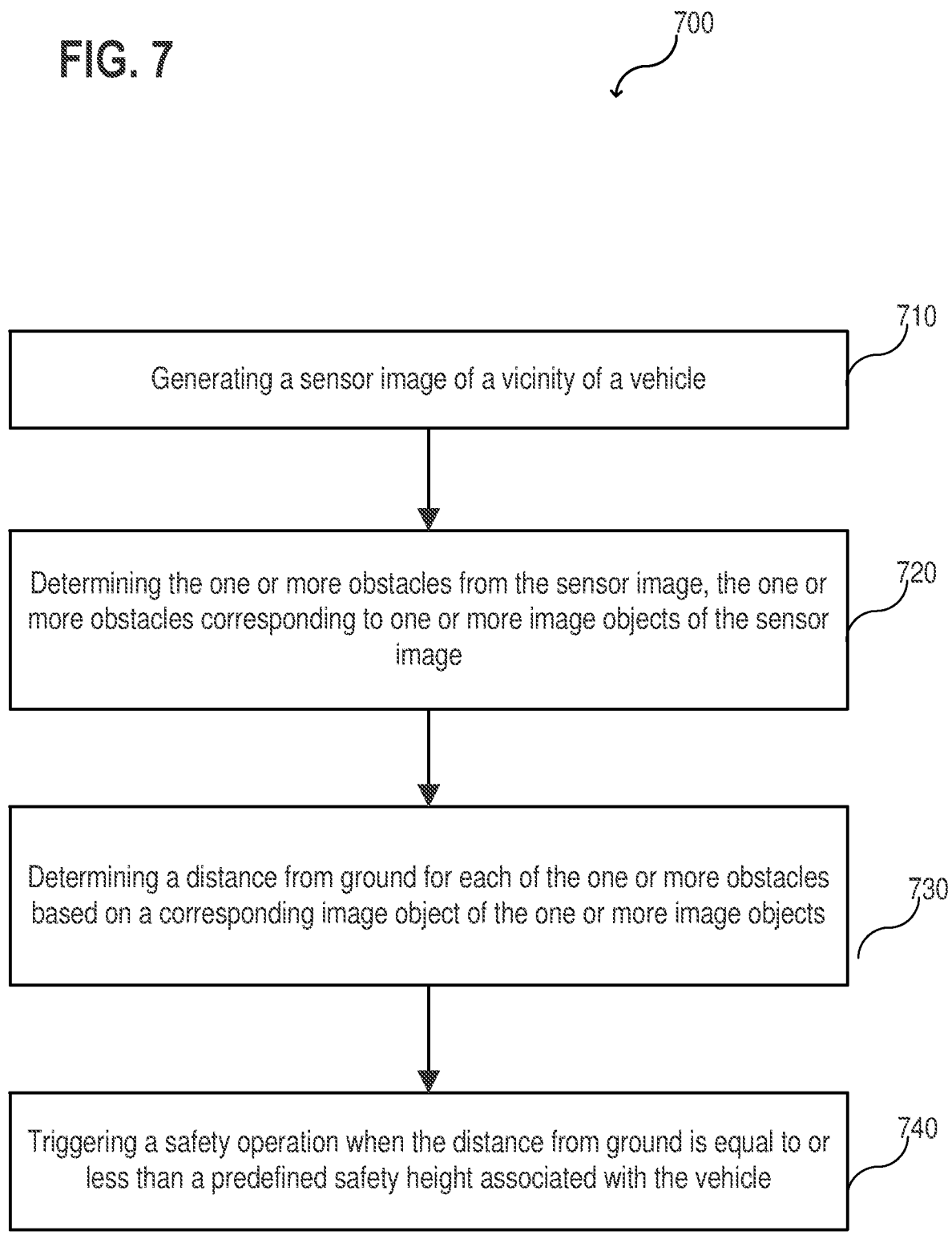
FIG. 7 shows an exemplary flow diagram of a method associated with operating a vehicle or collision avoidance, according to some aspects.

FIG. 7 illustrates a schematic flow diagram of a method 700 for operating a vehicle, e.g. method for avoiding a collision of the vehicle with one or more obstacles, according to various aspects. The method 700 may include: in 710, generating a sensor image of a vicinity of a vehicle; in 720, determining the one or more obstacles from the sensor image, the one or more obstacles corresponding to one or more image objects of the sensor image, in 730, determining a distance from ground for each of the one or more obstacles based on a corresponding image object of the one or more image objects, and, in 740, triggering a safety operation when the distance from ground is equal to or less than a safety height associated with the vehicle.

According to some aspects, the method 700 may include similar or the same functions as described herein with respect to the vehicle 100 and/or the collision avoidance system.

Figure 8:
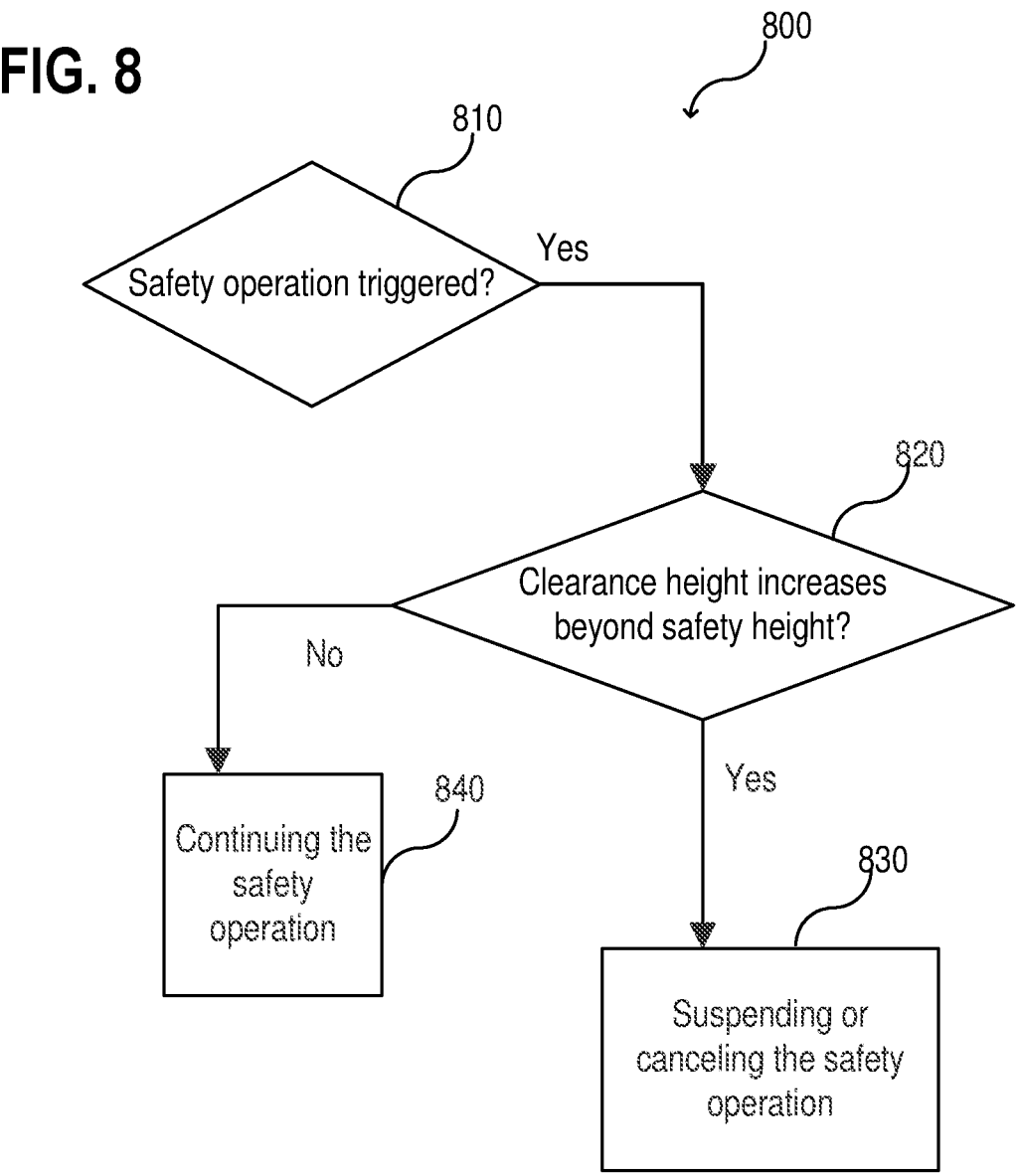
FIG. 8 shows an exemplary flow diagram of a process associated with operating a vehicle or collision avoidance, according to some aspects.

FIG. 8 illustrates a schematic flow diagram of a process 800, according to various aspects. The process 800 may include, in 810, checking whether a safety operation is triggered or not. In the case that a safety operation is triggered the clearance height may be less than the safety height, e.g. less than the maximum height of the vehicle 100. The process 800 may further include, in 820, checking whether the clearance height increases beyond the safety height, e.g. beyond the maximum height of the vehicle 100, or not. When the clearance height increases beyond the safety height, the process 800 may include, in 830, suspending or canceling the safety operation. When the clearance height remains below the safety height, the process 800 may include, in 840, continuing the safety operation. When the safety operation is continued, operation 820 of the process 800 may be carried out again.

According to various aspects, an obstacle may include any solid object that could harm the vehicle 100 in the case of a collision. The obstacle may be, for example, any solid object disposed vertically distanced from ground, e.g. from the street on which the vehicle 100 may drive.

In the following, various examples are provided with reference to the aspects described above.

Example 1 is a vehicle 100, including: one or more image sensors 110 configured to provide sensor image data 112d representing a sensor image 112i of a vicinity 130 of the vehicle 100; one or more processors 120 configured to determine one or more obstacles 132 from the sensor image data 112d, the one or more obstacles 132 corresponding to one or more image objects 114 of the sensor image 112i, determine a distance from ground 235 for each of the one or more obstacles 132 based its corresponding image object 114, and trigger a safety operation when the distance from ground 235 is equal to or less than a safety height associated with the vehicle 100.

In example 2, the vehicle 100 of example 1 may further include that the safety height is greater than a maximum height 115 of at least one of the vehicle 100 or a cargo 140 of the vehicle 100.

In example 3, the vehicle 100 of example 2 may further include that the vicinity of the vehicle includes a monitoring area 250 located ahead of the vehicle and disposed above a predefined height level 255. The predefined height level 255 may be at least two meters above ground.

In example 4, the vehicle 100 of any one of examples 1 to 3 may further include that the one or more image sensors 110 are part of an optical imaging system 310. The optical imaging system 310 may include at least one lens 314 and a focal length 314d associated therewith.

In example 5, the vehicle 100 of example 3 may further include that the determination of the distance from ground includes: determining an obstacle range 233 associated with a range of a respective obstacle 132 from the at least one lens 314; determining, based on the sensor image 112i, an image distance from ground 225 for the corresponding image object 112i; and determining the distance from ground based 235 on the focal length 314f, the image distance from ground 225, and the obstacle range 233.

In example 6, the vehicle 100 of example 5 may further include that determining the distance from ground 235 is based on a calculation using at least one lens equation.

In example 7, the vehicle 100 of example 5 or 6 may further include that determining the obstacle range 233 includes superimposing (also referred to as overlaying) one or more calibrated lines 414 onto the sensor image 112i.

In example 8, the vehicle 100 of example 5 or 6 may further include: one or more range sensors configured to receive obstacle range information associated with the obstacle range 233, wherein the determination of the obstacle range 233 is based on the obstacle range information.

In example 9, the vehicle 100 of example 5 or 6 may further include that the one or more image sensors 110 include one or more range imaging sensors 510 to generate the sensor image 112i and obstacle range information associated with the one or more image objects 114 of the sensor image 112i, wherein the determination of the obstacle range 233 is based on the obstacle range information.

In example 10, the vehicle 100 of example 9 may further include that the one or more range imaging sensors 510 include at least two cameras 530 configured to generate at least two photographic images taken from different vantage points 530a, 530b to generate the sensor image 112i.

In example 11, the vehicle 100 of any one of examples 1 to 10 may further include: an infrared illumination device 532 configured to at least partially illuminate a field of vision 130v of the one or more image sensors.

In example 12, the vehicle 100 of any one of examples 1 to 11 may further include that a line of vision 501 of the one or more image sensors 110, 510 is aligned in a forward driving direction and/or in a rear driving direction.

In example 13, the vehicle 100 of any one of examples 1 to 12 may further include that the one or more processors 120 are further configured to trigger the safety operation only when the distance from ground 235 is equal to or less than the safety height for a time period greater than or equal to a predetermined time period.

In example 14, the vehicle 100 of example 13 may further include that the predetermined time period is greater than about 30 milliseconds. The predetermined time period may be in the range from about 30 milliseconds to about 1000 milliseconds.

In example 15, the vehicle 100 of any one of examples 1 to 14 may further include that, after the safety operation is triggered, the one or more processors 120 are further configured to continue the safety operation during a time period in which the distance from ground 235 is equal to or less than the safety height and to suspend or cancel the safety operation in the case that the distance from ground 235 increases beyond the safety height.

In example 16, the vehicle 100 of any one of examples 1 to 15 may further include that the safety operation includes at least one of the following safety operations: stopping the vehicle, slowing the vehicle down, sending a signal to an external infrastructure, generating an acoustical alarm to the driver of the vehicle, generating an optical alarm to the driver of the vehicle, generating a vibration alarm to the driver of the vehicle, and/or reducing a maximum height of the vehicle.

In example 17, the vehicle 100 of any one of examples 1 to 16 may further include that the safety operation includes reducing an inflation pressure of one or more tires 100t of the vehicle 100 to reduce a maximum height 115 of the vehicle 100.

In example 18, the vehicle 100 of any one of examples 1 to 17 may further include that determine one or more obstacles includes determining an overpass (as an obstacle) extending over a path of travel of the vehicle (e.g. over the street or the driving line on which the vehicle 100 may drive), wherein the distance from ground 235 is associated with a clearance height of the overpass.

In example 19, the vehicle 100 of example 18 may further include that the one or more processors 120 are further configured to determine the clearance height of the overpass over the entire width of a driving lane 240.

In example 20, the vehicle 100 of example 19 may further include that the one or more processors 120 are further configured to determine a minimal clearance height of the overpass with respect to the width of the driving lane 240, wherein the distance from ground 235 is associated with the minimal clearance height.

Example 21 is a method for avoiding a collision of a vehicle with one or more obstacles, the method including: generating a sensor image of a vicinity of a vehicle; determining the one or more obstacles from the sensor image, the one or more obstacles corresponding to one or more image objects of the sensor image, determining a distance from ground for each of the one or more obstacles based on a corresponding image object of the one or more image objects, and triggering a safety operation when the distance from ground is equal to or less than a safety height associated with the vehicle.

In example 22, the method of example 21 may further include that the safety height is greater than a maximum height of the vehicle or of a load carried by the vehicle.

In example 23, the method of example 22 may further include that the sensor image displays a region ahead of the vehicle above a height of at least 2 m.

In example 24, the method of any one of examples 21 to 23 may further include that the sensor image is generated via an optical imaging system, the optical imaging system including at least one lens and a focal length associated therewith.

In example 25, the method of example 24 may further include that determining the distance from ground for a respective obstacle of the one or more obstacles includes: determining an obstacle range associated with a distance of the respective obstacle from the at least one lens; determining, for the corresponding image object of the sensor image, an image distance from ground associated with the distance from ground; and determining the distance from ground based on the focal length, the image distance from ground, and the obstacle range.

In example 26, the method of example 25 may further include that determining the distance from ground is based on a calculation using at least one lens equation.

In example 27, the method of example 25 or 26 may further include that determining the obstacle range includes overlaying one or more calibrated lines onto the sensor image.

In example 28, the method of example 26 or 27 may further include: generating range information associated with the obstacle range, wherein the determination of the obstacle range is based on the range information.

In example 29, the method of any one of examples 21 to 28 may further include that the sensor image is generated via one or more range imaging sensors.

In example 30, the method of example 29 may further include that the one or more range imaging sensors include at least two cameras configured to generate at least two photographic images taken from different vantage points to generate the sensor image having range information associated with the one or more image objects of the sensor image.

In example 31, the method of any one of examples 21 to 30 may further include: at least partially illuminating a field of vision of the one or more image sensors with infrared light.

In example 32, the method of any one of examples 21 to 31 may further include that a line of vision of the one or more image sensors is aligned in a forward driving direction and/or in a rear driving direction.

In example 33, the method of any one of examples 21 to 32 may further include that the safety operation is only triggered when the distance from ground is equal to or less than the safety height for a time period greater than or equal to a predetermined time period.

In example 34, the method of example 33 may further include that the predetermined time period is greater than about 30 milliseconds. The predetermined time period may be in the range from about 30 milliseconds to about 1000 milliseconds.

In example 35, the method of any one of examples 21 to 34 may further include: after triggering the safety operation, continuing the safety operation during a time period in which the distance from ground is equal to or less than the safety height; and suspending or canceling the safety operation when the distance from ground increases beyond the safety height.

In example 36, the method of any one of examples 21 to 35 may further include that the safety operation includes at least one of: stopping the vehicle, reducing speed of the vehicle, sending a signal to an external infrastructure, generating an acoustical alarm to the driver of the vehicle, generating an optical alarm to the driver of the vehicle, generating a vibration alarm to the driver of the vehicle, and/or reducing a maximum height of the vehicle.

In example 37, the method of any one of examples 21 to 36 may further include that the safety operation includes reducing the inflation pressure of one or more tires of the vehicle to reduce a maximum height of the vehicle.

In example 38, the method of any one of examples 21 to 37 may further include that determine the one or more obstacles includes determining an overpass extending over a path of travel of the vehicle, wherein the distance from ground is associated with the clearance height of the overpass.

In example 39, the method of example 38 may further include that the clearance height is determined over the entire width of a lane on which the vehicle is driving.

In example 40, the method of example 39 may further include: determining a minimal clearance height of the overpass with respect to the width of the lane, wherein the distance from ground is associated with the minimal clearance height.

Example 41 is a vehicle 100, including: one or more cameras 110, 510 configured to provide a camera image 112*i* of a vicinity 130 of the vehicle 100 along a driving lane 240; one or more processors 120 configured to determine, from the camera image 112*i*, one or more obstacles 132 disposed over the driving lane 240; determine a clearance height for each of the one or more obstacles 132 based on one or more image objects 114 from the camera image 112*i* associated with the one or more obstacles 132, and trigger a safety operation when the clearance height is equal to or less than a safety height associated with the vehicle.

In example 42, the vehicle 100 of example 41 may further include that one or more processors 120 are further configured to determine an impact time associated with an impact of the one or more obstacles 132 into the vehicle 100 when the clearance height is equal to or less than the safety height.

In example 43, the vehicle 100 of example 42 may further include that the safety operation includes displaying the impact time to a driver of the vehicle 100.

In example 44, the vehicle 100 of any one of examples 41 to 43 may further include that the one or more processors 120 are further configured to determine an obstacle range 233 for each of the one or more obstacles 132 based on one or more calibrated camera lines 414 superimposed onto the camera image 112*i*, the obstacle range 233 is associated with a range of the respective obstacle (of the one or more obstacles 132) from the one or more cameras 110, 510.

In example 45, the vehicle 100 of example 444 may further include that determine the clearance height includes: calculating the clearance height from the camera image 112*i* based on one or more lens equations and based on the obstacle range 233.

In example 46, the vehicle 100 of any one of examples 41 to 45 may further include that the one or more processors 120 are further configured to receive height data corresponding to a maximum height 115 of the vehicle 100, and to adapt the safety height based on the height data.

Example 47 is a non-transient computer readable medium configured to cause one or more processors to perform a method for avoiding a collision of a vehicle with one or more obstacles, the method including: generating a sensor image of a vicinity of a vehicle; determining the one or more obstacles from the sensor image, the one or more obstacles corresponding to one or more image objects of the sensor image, determining a distance from ground for each of the one or more obstacles based on a corresponding image object of the one or more image objects, and triggering a safety operation when the distance from ground is equal to or less than a safety height associated with the vehicle.

Example 48 is a non-transient computer readable medium configured to cause one or more processors to perform the method of any one of examples 21 to 40.

Example 49 is a collision avoidance system, including: one or more image sensors 110 configured to provide sensor image data 112*d* representing a sensor image 112*i* of a vicinity 130 of a ehicle 100; one or more processors 120 configured to determine one or more obstacles 132 from the sensor image data 112*d*, the one or more obstacles 132 corresponding to one or more image objects 114 of the sensor image 112*i*, determine a distance from ground 235 for each of the one or more obstacles 132 based its corresponding image object 114, and trigger a safety operation when the distance from ground 235 is equal to or less than a safety height associated with the vehicle 100. The collision avoidance system of example 49 may be configured in a similar way as described in any one of examples 2 to 20 with reference to the vehicle 100.

Example 50 is a collision avoidance system, including: one or more cameras 110, 510 configured to provide a camera image 112*i* of a vicinity 130 of a vehicle 100 along a driving lane 240; one or more processors 120 configured to determine, from the camera image 112*i*, one or more obstacles 132 disposed over the driving lane 240; determine a clearance height for each of the one or more obstacles 132 based on one or more image objects 114 from the camera image 112*i* associated with the one or more obstacles 132, and trigger a safety operation when the clearance height is equal to or less than a safety height associated with the vehicle. The collision avoidance system of example 50 may be configured in as similar way as described in any one of examples 42 to 46 with reference to the vehicle 100.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A vehicle, comprising:
    an image sensor configured to provide sensor image data representing a sensor image of a vicinity of the vehicle;
    a depth sensor configured to provide a range image, wherein each pixel of the range image includes distance information; and
    a processor configured to:
        determine one or more obstacles from the sensor image data, the one or more obstacles corresponding to one or more image objects of the sensor image,
        associate the sensor image data with the distance information to determine a distance from the depth sensor for each of the one or more obstacles,
        determine a distance from ground for each of the one or more obstacles based its corresponding image object,
        compare the distance from ground with a safety height of the vehicle, and
        trigger a safety operation based on the comparison and the distance from the depth sensor.

2. The vehicle of claim 1,
    wherein the safety height is greater than a maximum height of at least one of the vehicle or a cargo of the vehicle.

3. The vehicle of claim 2,
    wherein the vicinity of the vehicle comprises a monitoring area located ahead of the vehicle and disposed above a predefined height level.

4. The vehicle of claim 1,
    wherein the image sensor is part of an optical imaging system, the optical imaging system comprising at least one lens and a focal length associated therewith.

5. The vehicle of claim 4,
    wherein the determination of the distance from ground comprises:
        determining an obstacle range associated with a range of a respective obstacle from the at least one lens;

determining, based on the sensor image, an image distance from ground for the corresponding image object; and determining the distance from ground based on the focal length, the image distance from ground, and the obstacle range.

6. The vehicle of claim 1, further comprising:
an infrared illumination device configured to at least partially illuminate a field of vision of the image sensor.

7. The vehicle of claim 1,
wherein a line of vision of the image sensor is aligned in a forward driving direction and/or in a rear driving direction.

8. The vehicle of claim 1,
wherein the one or more processors are further configured to trigger the safety operation only in the case that the distance from ground is equal to or less than the safety height for a time period greater than or equal to a predetermined time period.

9. The vehicle of claim 1,
wherein, after the safety operation is triggered, the one or more processors are further configured to continue the safety operation during a time period in which the distance from ground is equal to or less than the safety height and to suspend or cancel the safety operation in the case that the distance from ground increases beyond the safety height.

10. The vehicle of claim 1,
wherein the safety operation comprises at least one of:
stopping the vehicle,
slowing the vehicle down,
sending a signal to an external infrastructure,
generating an acoustical alarm to the driver of the vehicle,
generating an optical alarm to the driver of the vehicle,
generating a vibration alarm to the driver of the vehicle, and/or
reducing a maximum height of the vehicle.

11. The vehicle of claim 1,
wherein the safety operation comprises reducing an inflation pressure of one or more tires of the vehicle to reduce a maximum height of the vehicle.

12. The vehicle of claim 1,
wherein the determining of one or more obstacles comprises determining an overpass extending over a path of travel of the vehicle, wherein the distance from ground is associated with a clearance height of the overpass.

13. The vehicle of claim 12,
wherein the one or more processors are further configured to determine the clearance height of the overpass over the entire width of a lane.

14. The vehicle of claim 13,
wherein the one or more processors are further configured to determine a minimal clearance height of the overpass with respect to the width of the lane, wherein the distance from ground is associated with the minimal clearance height.

15. The vehicle of claim 1,
wherein the processor is further configured to determine a time to impact between the vehicle and at least one of the one or more obstacles; and
wherein the safety operation is further based on time to impact.

16. The vehicle of claim 15,
wherein the depth sensor is a time of flight (ToF) camera.

17. A method for avoiding a collision of a vehicle with one or more obstacles, the method comprising:
generating a sensor image of a vicinity of a vehicle;
generating a depth information of the vicinity of the vehicle;
determining the one or more obstacles from the sensor image, the one or more obstacles corresponding to one or more image objects of the sensor image,
associating the sensor image with the depth information to assign depth information for each of the one or more image obstacles,
determining a distance from ground for each of the one or more obstacles based on a corresponding image object of the one or more image objects,
comparing the distance from ground with a safety height of the vehicle, and
triggering a safety operation when based on the comparison and the depth information of the one or more obstacles.

18. The method of claim 17,
wherein the sensor image is generated via an optical imaging system, the optical imaging system comprising at least one lens and a focal length associated therewith, and
wherein determining the distance from ground for a respective obstacle of the one or more obstacles comprises:
determining an obstacle range associated with a distance of the respective obstacle from the at least one lens,
determining, for the corresponding image object of the sensor image, an image distance from ground associated with the distance from ground; and
determining the distance from ground based on the focal length, the image distance from ground, and the obstacle range.

* * * * *